Patented July 1, 1947

UNITED STATES PATENT OFFICE 2,423,415

2,423,415

PROCESS FOR THE PRODUCTION OF AN INDENE PHENOL

Frank J. Soday, Baton Rouge, La., assignor to The United Gas Improvement Company, a corporation of Pennsylvania No Drawing. Application May 17, 1943, Serial No. 487,338

5 Claims. (Cl. 260—619)

This invention pertains generally to a process for the production of reaction products of an indene type compound and a phenol, and pertains particularly to the production of indene phenol.

The invention pertains more particularly to the production of compounds of this type capable of being further reacted with aldehydes generally to obtain resins of the phenol-aldehyde type which are soluble in the usual drying oils, such as linseed and tung oils.

There is thus made available oil soluble resins of the phenol-aldehyde type which are ideally suited for incorporation in liquid coating compositions, such as varnishes, lacquers, paints and the like, either alone or in combination with other resins.

The outstanding characteristics of the phenol-aldehyde type of resin are thus made available in the liquid coating composition field.

Since the more common phenol-aldehyde resins are not soluble in drying oils to a satisfactory degree, the use of such resins in the liquid coating composition field is limited.

However, after having acquired the quality of unusual oil solubility, the field of use of resins of the phenol-aldehyde type is greatly extended.

The reaction of indene with phenol with the production of substituted phenols, has been described in the prior art.

In the processes thus described, the reaction between indene and phenol generally is brought about by the use of sulfuric or acetic acids as catalysts.

Because of the relatively low yields obtained and the relatively large amount of catalyst employed, which adds greatly to the cost, these processes have not achieved any industrial importance.

I have discovered that the indene-phenol type compounds generally and indene phenol particularly may be produced with high yields of excellent quality by reacting a hydrohalide of indene with a phenol in the presence of a suitable catalyst.

In addition to pure indene, commercial and technical grades thereof, I may also employ fractions and/or mixtures containing any desired proportion of indene in the practice of my invention.

The use of light oil indene fractions, such as those obtained by the pyrolysis of petroleum or of petroleum hydrocarbons at temperatures above 1100° F. and more particularly above 1300° F. in the vapor phase in the presence of steam, is preferred, as such fractions contain very little, if any, coumarone, or other oxygen, nitrogen, or sulfur containing unsaturated impurities of the type commonly found in coal tar fractions.

I generally prefer to employ indene fractions boiling mainly in the range of 175 to 190° C. and more particularly in the range of 178 to 185° C.

While fractions containing almost any desired proportion of indene may be used in the practice of my invention, I prefer to employ fractions containing at least 30% indene and more particularly at least 50% indene. Excellent results are obtained by the use of fractions containing at least 70% indene.

Substituted indenes, such as the methyl indenes also may be employed in the practice of my invention. Light oil methyl indene fractions obtained from the above source and boiling mainly in the range of 190 to 220° C. are preferred.

Examples of phenols are phenol itself, other mono or poly-valent phenols, their substitution products such as the halogen, sulfo, alkyl, aryl, aralkyl, nitro, carboxyl, and azo-nuclear substitution products, and phenolic compounds in general. Within this class of compounds are included cresol, amino-phenols, nitro-phenols, chloro-phenols, thymol, naphthols, pyrocatechol, resorcinol, hydroquinone, pyrogallol, oxyhydroquinone, phloroglucinol, carvacrol, quinol, xylenol, guaiacol, orcinol, mesitol, pseudocumenol, toluhydroquinone, alpha naphthol, and beta naphthol, as well as mixtures containing one or more of these compounds.

Low temperature tar phenols and mixtures of phenolic compounds also may be used. These are contained, for example, in tar oils or alcohols, such as benzyl alcohol, or acids, such as acetic acid. The phenolic compounds may be used in the pure state, or as crude materials, or as technical mixtures.

Phenolic ethers also may be used in the process.

The foregoing compounds will be referred to herein as "phenolic compounds" or "phenols."

In carrying out the reaction between an indene hydrohalide and a phenol, I prefer to employ as a catalyst one or more metal halides which term includes the boron halides and the complexes of all of the foregoing halides, and particularly the organic solvent complexes of said halides.

Examples of metal halides are aluminum chloride, zinc chloride, ferric chloride, boron trifluoride, boron trichloride, aluminum bromide, stannic chloride, titanium chloride, antimony bromide, and antimony chloride. These compounds are members of a group which for convenience may be designated as acid-acting metal halides. The reaction products resulting from the addition of these halides to diethyl ether may be regarded as examples of acid-acting metal halide-organic solvent complexes, though complexes are formed with many other organic solvents as well as other materials as is well known in the art.

Other catalysts which might be employed are the metal oxides such as aluminum oxide, thorium oxide, tungstic oxide, and phosphoric anhydride; metal salts, such as potassium bisulphate, aluminum sulfate, aluminum phosphate, and aluminum silicate and contact substances, such as silica gel, alumina, tonsil, kaolin, activated charcoal, clay, kieselguhr, diatomaceous earth, fuller's earth, pumice, silicious earths, and metallic hydrosilicates.

Catalysts may be employed singly or in mixtures with each other and may or may not be deposited on carriers, such as the previously listed contact materials or other substances such as barium sulfate, pumice, asbestos and silica.

The indene hydrohalide to be used as starting material may be obtained from any suitable source known in the art, or may be prepared, for instance, by the addition of a selected hydrogen halide, such as hydrogen chloride to indene.

In case the indene hydrohalide is to be prepared, the indene to be hydrohalogenated may be either in concentrated form or in the form of a fraction or solution.

For example, indene may be obtained from light oil produced in the manufacture of gas, such as carburetted water gas or oil gas. The concentration of indene in a fraction is frequently relatively low, particularly in the case of forerunnings and afterrunnings, due to the difficulty of concentrating by distillation compounds which are capable of being polymerized by heat.

All of such fractions lend themselves to the production of indene hydrohalides.

The indene hydrohalides may be separated from such fractions, say by distillation, or may be employed without such separation.

As a general rule, the isomeric indene hydrohalides are produced in this way.

However, the reaction might be carried out in a manner such that one or the other form predominates.

If desired, the isomeric compounds may be separated prior to their reaction with the phenol, or they may be reacted with the phenol without previous separation.

There are several possible reactions between a particular indene hydrohalide and a phenol.

The reaction between indene hydrohalide and phenol presumably takes place in the following manner.

(1)

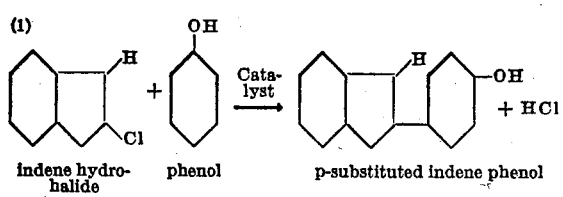

indene hydro-   phenol   p-substituted indene phenol
halide

The product shown represents the para substitution product.

From theoretical considerations, the ortho compound also may be formed in the same reaction as follows:

(2)

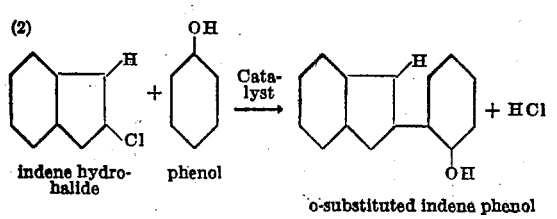

indene hydro-   phenol
halide o-substituted indene phenol

Presumably very little, if any, meta substituted compound is formed.

The isomeric indene hydrohalide also may react with phenolic compounds in a similar manner.

(3)

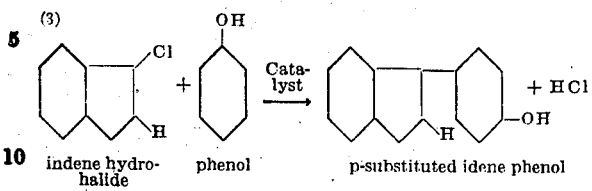

indene hydro-   phenol   p-substituted idene phenol
halide

The product shown in reaction (3) is the para substituted form.

The ortho substituted form also may be formed in this reaction as shown in the following equation.

(4)

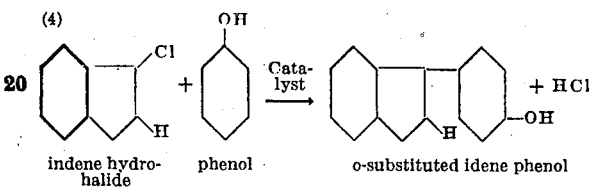

indene hydro-   phenol   o-substituted idene phenol
halide

Presumably very little, if any, meta substituted compound is formed.

The reaction between an indene hydrohalide and a phenol may also result in the production of di- and poly-substituted derivatives, as shown, for example, by the following equation.

(5)

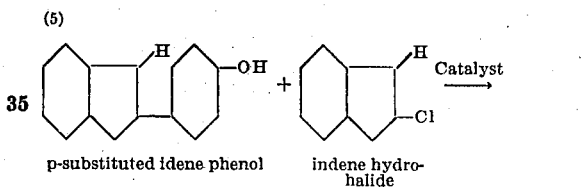

p-substituted idene phenol   indene hydro-
halide

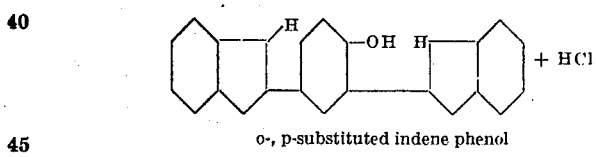

o-, p-substituted indene phenol

In addition, indene hydrohalides may react with phenolic compounds to give phenolic ethers, as shown in the following equation.

(6)

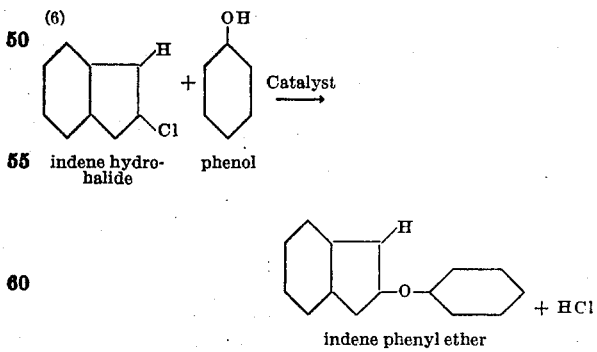

indene hydro-   phenol
halide indene phenyl ether

Accordingly, a separation step, such as by distillation, usually follows the reaction if it is desired to employ the indene phenol apart from the other materials.

Furthermore, while the mono-substituted derivatives, namely indene phenols, normally predominate in the reaction product over the di- and poly-substituted derivatives, it is possible to vary the proportion of one to the other by varying the proportion of starting materials.

For example, when phenol is in excess, indene phenol predominates in the reaction product, while when indene hydrohalide is in excess the reaction product contains larger quantities of di- and poly-indene phenols.

In carrying out my invention, the reactants may be combined in any desired manner whether or not in concentrated form, or in solution or admixture.

Contact between the materials may be effected in any manner known in the art. In this connection, reference is had to the very large number of different ways of contacting reactants in the prior art.

However, it is preferred when the chosen phenol is in excess to add the chosen indene hydrohalide to a mixture of the phenol and the catalyst.

On the other hand, when the chosen indene hydrohalide is in excess, it is preferred to add the chosen phenol to a mixture of the indene hydrohalide and the catalyst.

The reaction may be carried out at almost any desired temperature which may vary during the reaction.

I find, for example, that excellent results are secured by conducting the first part of the reaction at moderate temperatures, for example, between 0° and 100° C., followed by higher temperatures, such as between 100° and 200° C.

Temperatures between 40 and 55° C. for the initial reaction followed by temperatures between 140° and 150° C. for the final reaction, are found to be particularly suitable.

In case the temperature is held uniform, temperatures between 10° and 180° C. are preferred.

While the reaction is customarily carried out at atmospheric pressure, it will be understood that sub-atmospheric and super-atmospheric pressures may be employed if desired.

The quantity of catalysts employed may also be varied over fairly wide limits. As an example, 0.1% to 10% by weight of catalyst to the combined weight of both reactants will be found suitable.

When using acid-acting metal halide catalysts or complexes thereof, 0.1% to 5% by weight of catalyst to the combined weight of both reactants is found particularly suitable.

In order to speed up the reaction and carry it further to completion, steps may be taken to remove hydrogen halide from the sphere of the reaction, such as by absorption, or by stirring or by passing an inert gas through the reaction mass.

The hydrogen halide thus displaced from the reaction mass may, of course, be recovered and reused in the hydrohalogenation of indene.

However, considerable quantities of hydrogen halide escape from the reaction mass without external aid.

The following example will further illustrate the process.

EXAMPLE 1

A light oil indene fraction, obtained by the fractionation of light oil obtained from oil gas and containing one mole is placed in a one liter three-neck flask equipped with a stirring device. The flask and its contents are cooled to a temperature of 0° C. and a moderate stream of dry hydrogen chloride introduced into the flask. The reaction is continued for a period of 24 hours, during which time approximately the theoretical amount of hydrogen chloride to convert the indene present to indene hydrohalide is absorbed.

The excess hydrogen chloride is removed from the indene fraction by distilling under reduced pressure. The residual material is washed with water, dried, and distilled in a Vigreux column to remove the unchanged hydrocarbons present. The residue then is fractionated.

The indene hydrohalide obtained is slowly added with good agitation to a mixture of one mol gram of phenol, 3.0 grams of aluminum chloride, and 200 grams of freshly dried n-heptane. The reaction mixture is agitated for a period of 6 hours at room temperature, followed by agitation for an additional period of one hour at a temperature of 100° C. During the first hour of the reaction, considerable quantities of hydrogen chloride is given off by the reaction mixture.

The catalyst component of the mixture is neutralized with a 20% aqueous solution of sodium carbonate and washed with several volumes of water. The product then is distilled under reduced pressure (4.5 mm.) in a Claissen flask. Approximately an 80% yield of indene phenol boiling in the range of 150 to 200° C. @ 4.5 mm. is obtained. Upon cooling and seeding, snowy white crystals of indene phenol are obtained.

If desired, the indene hydrohalide may be generated in situ.

For example, the indene hydrohalide may be prepared from the hydrogen halide liberated during the course of the reaction with the phenol. In this instance, a small amount of indene hydrohalide may be added to the reaction mass to start the reaction, followed by the addition of the remainder of the indene.

On the other hand, hydrogen halide may be supplied by bubbling it through the reaction mass. This is illustrated in Example 2.

EXAMPLE 2

A mixture of 329.5 grams of phenol, 2 grams of an 83.7% indene fraction (containing 1.7 grams of indene) and 1.7 grams of aluminum chloride was placed in a one-liter three-neck flask at room temperature. Gaseous hydrogen chloride was passed through this mixture for a period of one minute, after which the addition of hydrogen chloride was discontinued. A 130 gram portion of the same indene fraction (containing 108.8 grams of indene) was slowly added to the mixture during a period of one hour. The mixture was continually agitated during this time and the temperature was maintained within 40–55° C. The temperature then was raised to 140–150° C. during a period of 20 minutes, and maintained at this point for an additional period of 2 hours.

The catalyst component of the solution then was neutralized with a 20% solution of sodium carbonate containing 3.9 grams of $Na_2CO_3$. The water layer was separated and the residue distilled in a modified Claissen flask under reduced pressure.

A total of 149.5 grams of idene phenol (74.8% yield), with a boiling range of 153–200° C. @ 4.5 mm. was obtained. A total of 23.3 grams of the higher boiling (200–247° C. @ 23.3 mm.) diindene phenol also was obtained.

The indene phenol was obtained as a light colored, viscous liquid which slowly crystallized on standing, forming colorless crystals.

A further modification of this invention resides in the preparation of indene phenol by the reaction of indene and a phenol in the presence of an acid-acting metal halide and moisture, of which a trace is frequently sufficient. It is found that the minute quantity of hydrogen halide liberated due to the presence of even a trace of moisture is sufficient to initiate the reaction.

This is illustrated in the following example:

EXAMPLE 3

A very slightly moist indene fraction obtained by the distillation of light oil from oil gas, and containing one mol of indene is slowly added with good agitation to a mixture of one mol of phenol and 1.56 grams of aluminum chloride during a period of one hour at a temperature of 40–55° C. The temperature is raised to 140–150° C. during a period of 20 minutes, and the contents of the flask maintained at this temperature during an additional period of 2 hours.

The catalyst then is neutralized by the addition of sodium carbonate in the form of a 20% solution. The residue then is distilled in a modified Claissen flask under reduced pressure.

Indene phenol is obtained in a yield of approximately 75%.

The boiling range of the indene phenol listed in the foregoing examples does not necessarily represent the true boiling range of the material due to excessive superheating during the distillation process.

The mechanism proposed for this reaction is of the chain type. Indene hydrohalide reacts with a phenol to give substituted phenolic compounds with the liberation of hydrogen halide, which in turn reacts with more indene to produce further indene hydrohalide, thus perpetuating the reaction.

A further extension is the addition of a small amount of some other hydrocarbon halide to the reaction mass with or without the presence of moisture to initiate the reaction by the liberation of a small amount of hydrogen halide, which in turn reacts with the indene present to form indene hydrohalide, the formation of which is then perpetuated.

The degree of contamination resulting from starting the reaction with a hydrocarbon halide becomes less significant, the larger the quantities of indene hydrohalide and phenol reacted.

On the other hand, larger quantities of alkyl or aryl halide may be employed to initiate the reaction, in which case the product eventually obtained will comprise a mixture of indene substituted phenols and phenolic ethers, as well as substituted phenols and phenolic ethers derived from the aryl or alkyl halide.

The product thus obtained may be, in turn, reacted as such with an aldehyde to form a resin, or its components may be previously separated such as by fractional distillation at reduced pressures, and then one or more separately reacted with an aldehyde.

The use of a substantial quantity of a hydrocarbon halide other than indene halides permits the preparation of substituted phenols with a wide variety of different properties, since the hydrocarbon halide may be selected from a wide variety of different compounds both alkyl and aryl.

Furthermore, the properties may be varied considerably by varying the relative proportions of hydrocarbon halide and indene hydrohalide.

Indene phenol may be isolated from the reaction mass if desired, by any means known in the art. For instance, it may be isolated by washing out any excess phenol followed by fractional distillation under reduced pressure.

Indene phenol also may be isolated directly by fractional distillation under reduced pressure.

When using fractional distillation fairly low pressures are recommended, such as pressures of the order of from 1 to 20 mm. absolute.

However, the reaction product may be reacted with an aldehyde without previous separation into component parts.

For example, it may be reacted with formaldehyde or formaldehyde yielding substances, such as hexamethylenetetramine, either with or without the addition of a further coupling agent, for example, a small amount of oxalic acid.

Usually, it will be found that a further coupling agent is not required since the residual hydrogen halide present in the reaction product serves as a very effective coupling agent.

The production of phenol-formaldehyde type resins is illustrated by the following examples.

EXAMPLE 4

A 0.5 mol portion of indene phenol was reacted with 0.8 mol of aqueous 38% formaldehyde with good stirring for a period of 20 hours, using a small amount of oxalic acid as a catalyst. The condensation product then was steam distilled.

The resinous product of the substituted phenol-formaldehyde type was obtained in a yield of 70%. The resin was completely compatible with both linseed oil and tung oil as shown in the following example.

EXAMPLE 5

A standard 15 gallon varnish was prepared from this resin in the following manner.

*Formula*

| | Parts |
|---|---|
| Resin | 12.2 |
| China-wood oil | 14.0 |
| Solvent naphtha V. M. & P | 26.2 |
| Drier (cobalt, manganese and lead drier) | 1.0 |

The mixture of resin and China-wood oil was heated in a copper beaker to a temperature of 400° F. during a period of 20 minutes. The mixture then was heated to a temperature of 560° F. during a period of 10 minutes, and held at this temperature for an additional period of 3 minutes. It was allowed to cool to 535° F., held at this temperature for a period of 6 minutes, chilled to 400° F. (by partially immersing the beaker in water) and reduced by the addition of the solvent naphtha. The drier was stirred into the varnish when it reached room temperature.

The product was a clear, light colored varnish with excellent coating properties. It may be used to coat metals, wood, and other surfaces, such as those of beverage and food containers.

The substituted phenolic compounds made in accordance with my invention, may be reacted with any of the aldehydes commonly used for the preparation of phenol-aldehyde type resins.

In the case of formaldehyde, gaseous formaldehyde, aqueous formaldehyde solutions of different concentrations, polymerization products of formaldehyde, such as trioxymethylene, polyoxymethylenes, or paraformaldehyde, or formaldehyde yielding substances, such as hexamethylene tetramine may be employed.

The resin forming reaction, if desired, may take place in the presence of inert substances, such as plasticizers, fillers, pigments, coloring bodies, and the like.

Furthermore, the resin-forming reaction may be carried out in the presence of fats; oils such as drying oils, linseed oil, tung oil, castor oil, oiticica oil; waxes, such as montan wax; natural resins, such as colophony, kauri, copal, dammar; and synthetic resins, such as coumarone resin, urea-formaldehyde resin and the like.

The resinification reaction may be carried out in two or more stages, if desired.

Thus, a product may be produced by a preliminary condensation reaction and the melting point raised by subsequent heating.

The products resulting from the resinification reaction may vary considerably in their properties, such as from resinous viscous liquids to solid substances of different degrees of hardness, depending upon the choice of the reactants used for resinification and resinification conditions such as temperature and reaction time.

As pointed out above, the resins thus produced are ideally suited for incorporation in liquid coating compositions, such as varnishes, lacquers, paints, and the like, in view of their unusual high solubility in the customary drying oils, such as linseed oil and tung oil.

My process is subject to considerable variation.

For instance, the production of indene phenol and the resinification reaction may take place simultaneously, in which case the aldehyde might be added to the reaction mass simultaneously with the other reactants or the aldehyde might be added at any other time or manner, such as at any stage after the reaction for the production of indene phenol has commenced.

This reaction usually does not require a coupling agent, however, a coupling agent may be added, if desired.

Generally speaking, coupling agents suitable for use herein may be of any type and either acid, neutral or alkaline in character.

From the foregoing description and examples, it will be seen that the hydrohalide of indene (which is also referred to for convenience as indene hydrohalide) may be previously formed or generated in situ. Therefore, for the purposes of the claims, the term "indene hydrohalide" unless otherwise modified, is intended to mean a hydrohalide of this character whether previously formed, or formed in situ.

It is to be understood that the above particular description is by way of illustration and that, broadly speaking, changes, omissions, additions, substitutions and/or modifications might be made within the scope of the claims without departing from the spirit of the invention which is intended to be limited only as required by the prior art.

I claim:

1. A process for the production of an indene phenol from indene which comprises reacting indene with a hydrohalide to produce indene hydrohalide and reacting the indene hydrohalide thus produced with phenol in the presence of aluminum chloride to produce said indene phenol.

2. A process for producing an indene phenol from indene which comprises reacting indene with hydrogen chloride to produce indene hydrochloride and reacting the indene hydrochloride thus produced with phenol in the presence of aluminum chloride to produce said indene phenol.

3. A process for the production of an indene phenol comprising contacting a light oil indene fraction with hydrogen chloride to form indene hydrochloride, reacting said indene hydrochloride with phenol in the presence of aluminum chloride, and separating an indene phenol from the reaction mixture.

4. A process for the production of indene phenol comprising admixing phenol with a relatively small amount of an indene hydrochloride and a relatively small amount of aluminum chloride, adding a light oil indene fraction to said mixture with agitation while maintaining the temperature at about 40° to 55° C., thereafter raising the temperature to about 140° to 150° C. and continuing the reaction for a desired period, and separating indene phenol from the reaction mixture.

5. A process for the production of indene phenol comprising admixing phenol with a light oil indene fraction containing a relatively small amount of moisture in the presence of a relatively small amount of aluminum chloride while maintaining the temperature at about 40° to 55° C., thereafter raising the temperature to about 140° C. to 150° C. and continuing the reaction for a desired period, and separating indene phenol from the reaction mixture.

FRANK J. SODAY.

REFERENCES CITED

The following references are of record in the file of this patent:

UNITED STATES PATENTS

| Number | Name | Date |
|---|---|---|
| 1,754,052 | Rosenthal | Apr. 8, 1930 |
| 2,017,877 | Turkington | Oct. 22, 1935 |
| 2,242,250 | Honel | May 20, 1941 |

OTHER REFERENCES

Courtot, "Comptes rendues," vol. 187, pp. 661–3 (1928). (Copy in Scientific Lib.)